March 9, 1937. O. H. ENSIGN 2,073,298
GAS CARBURETING APPARATUS
Filed June 15, 1935 2 Sheets-Sheet 1
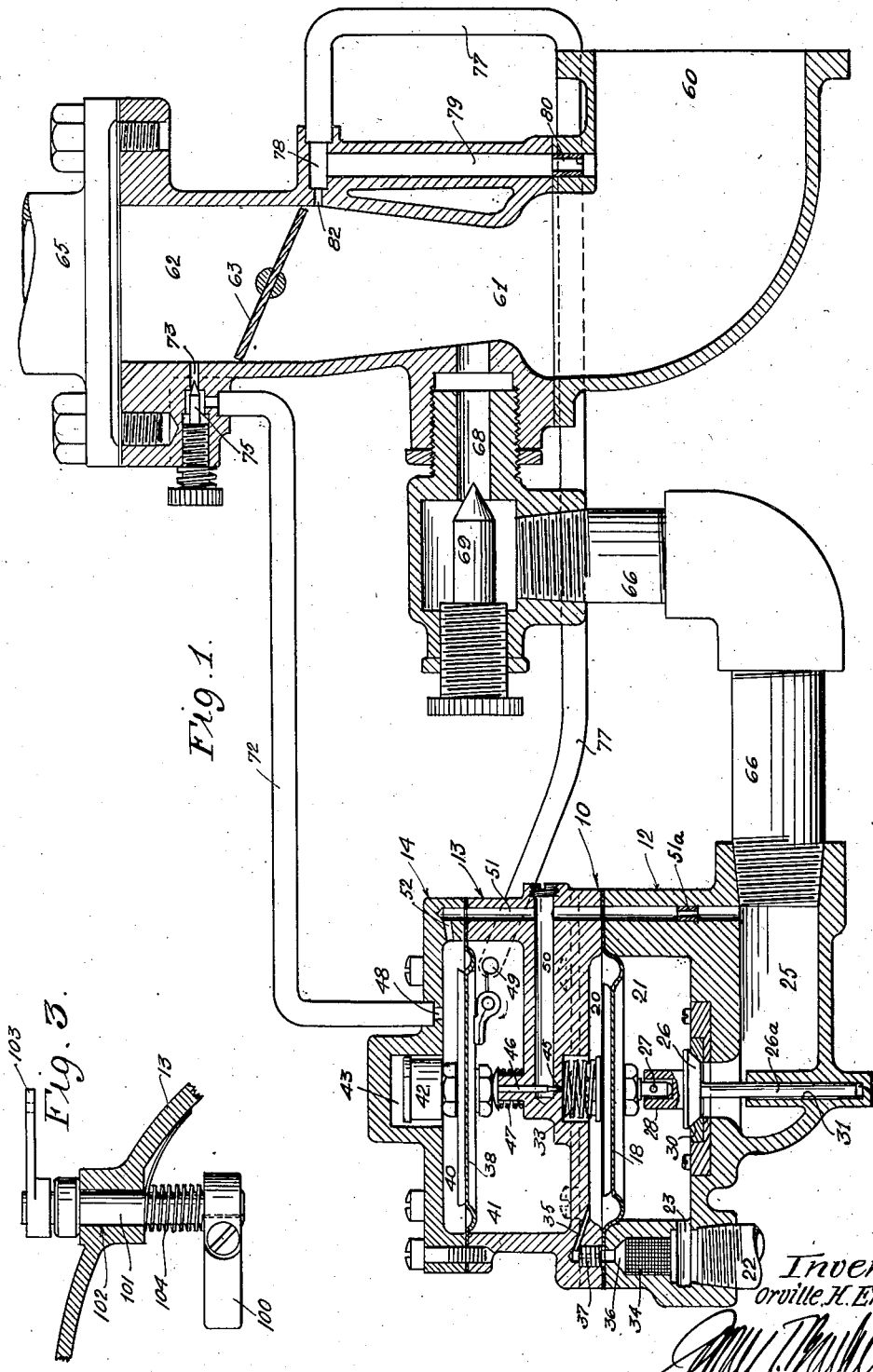
Inventor.
Orville H. Ensign,
Attorney.

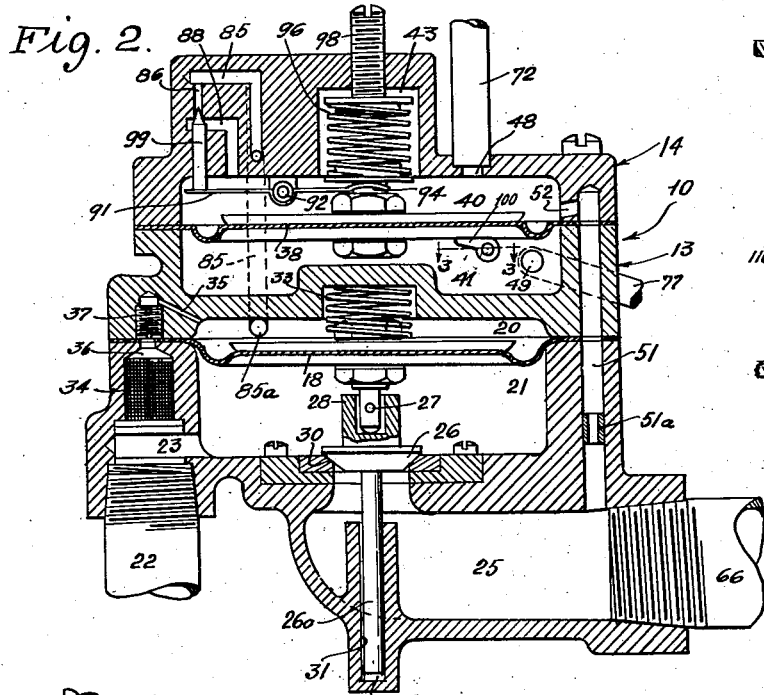
March 9, 1937. O. H. ENSIGN 2,073,298
GAS CARBURETING APPARATUS
Filed June 15, 1935 2 Sheets-Sheet 2
Inventor
Orville H. Ensign
Attorney Patented Mar. 9, 1937

2,073,298

UNITED STATES PATENT OFFICE 2,073,298

GAS CARBURETING APPARATUS

Orville H. Ensign, Pasadena, Calif., assignor to Ensign Carburetor Co. Ltd., Huntington Park, Calif., a corporation of California Application June 15, 1935, Serial No. 26,768

16 Claims. (Cl. 48—184)

This invention has to do generally with improved apparatus for supplying gaseous fuel to internal combustion engines at a substantially constant predetermined pressure, and at rates varying in accordance with the speed and load requirements of the engine. Particularly, the invention in one of its major aspects is directed to the combination of a gas pressure regulator and carbureter in a system similar to that disclosed in an application made by Roy F. Ensign on Gas carbureting apparatus, Ser. No. 671,979, filed on May 20, 1933, the present apparatus differing primarily from that described in the Roy F. Ensign application with the respect to the type of gas pressure regulator used and in the particular manner in which the modifying influences of the carbureter act to control the regulator operation.

It is a primary object of my invention to provide a pressure regulator in the above described combination, that will deliver gas to the carbureter at a constant pressure throughout the entire range of delivery rate, so that changes in that rate cause only evanescent fluctuations in delivery pressure that serve to adjust the position of the pressure regulating valve to the new delivery rate and to restore the normal delivery pressure. A further object is to provide a regulator in which the delivery pressure is independent of the pressure at which the gas is supplied to the regulator, so that proper operation of the regulator does not require, below a maximum for which the regulator may be specially designed, any given constant initial pressure.

In the present system, I employ a differential pressure type regulator in which the main flow control valve is operated by a main diaphragm in accordance with or in response to movements of a pilot diaphragm, and a pilot valve operated by the latter. Operating in combination with a gas carbureter having a throttle controlled suction passage taking fuel from the regulator outlet, the regulator acts to deliver fuel to the carbureter at varying rates corresponding to the requirements of engine operation, in response to pressure changes in the carbureter suction passage, the latter being placed in communication with the regulator pilot diaphragm by way of a system of connections which render the pilot diaphragm, and the main diaphragm and regulator valve, responsive to the fuel requirements of the engine under all conditions of operation. It is also an object of the invention to provide a regulator specially adapted to automatically close when fuel is no longer withdrawn but will open immediately when fuel is required. I thus prevent wastage and danger from leakage that are both present if a manual shut-off valve is relied upon.

In the regulator itself, the main valve operating diaphragm is exposed at both sides to the initial fluid pressure, but the passage leading to one side of the diaphragm is restricted so that the pressure against that side may be bled off to create a pressure differential that actuates the diaphragm and the valve attached thereto. The pilot diaphragm is in equilibrium between the delivery pressure and a base or reference pressure, but is influenced by certain variable or modifying forces which act to vary the rate of gas delivery to the outlet while maintaining a substantially constant outlet pressure. More specifically, the forces modifying the rate of fuel delivery are applied to the pilot diaphragm via communications leading from selected and particularly located points in the carbureter suction passage, to change the relative magnitude of the forces that determine the delivery rate. The regulator may be set to deliver normally at subatmospheric pressure, but by the modifying forces applied to the pilot diaphragm a higher operating delivery pressure is obtained, so a rise to atmospheric pressure in the delivery passage when the engine is not running, and the modifying forces are not present, causes the valve to automatically close.

How these and other objects and advantages of the invention are obtained will be more fully understood by reference to the accompanying drawings and the following description wherein I show and describe typical embodiments of my invention. In the drawings:

Fig. 1 is a vertical sectional view showing one form of my improved gas pressure regulator operatively connected to a typical form of carbureter;

Fig. 2 is a vertical section of a modified form of regulator;

Fig. 3 is a fragmentary enlarged section on line 3—3 of Fig. 2, showing the priming device;

Fig. 4 is a view similar to Fig. 2, showing a further variational form of regulator;

Figs. 5 and 6 are fragmentary enlarged sections on lines 5—5 and 6—6, respectively, of Fig. 4; and Fig. 7 is a vertical fragmentary section showing a variational form of gas communication between the chambers at opposite sides of the main diaphragm.

Fig. 1 illustrates a regulator adjusted for a normally sub-atmospheric delivery pressure. The body of the regulator generally indicated at 10 is made up of three parts, main portion 12, intermediate portion 13, and cover portion 14.

Primary diaphragm 18 is clamped at its periphery between body portions 12 and 13 to form pressure chambers 20 and 21, respectively above and below the diaphragm. Gas enters pressure chamber 21 by way of supply line 22 and passage 23; and the flow therefrom into regulator delivery passage 25 is controlled by pressure regulating valve 26 which is attached by means of pin 27 to stem 28 depending from the lower side of primary diaphragm 18, so that the position of the valve is determined by the position of the diaphragm. A valve seat is provided at 30.

Valve stem 26a slides within guide bore 32, and the guide is provided with a longitudinally extending groove 31 which acts as a duct to pass gas to and from the bottom of bore 32, and so permit unimpeded operation of the valve.

Compression spring 33 seats in a recess in body portion 13 and bears against the upper face of diaphragm 18 for the purpose of securely pressing the regulator valve against seat 30; but if the weight of the parts is such as to secure this result the spring may be omitted.

For the purpose of effecting proper pressure valve regulation in the manner to be later described, gas is introduced into chamber 20 through passages 35 and 36 from inlet passage 23. There is placed in passage 36, bushing 37 having therein a calibrated orifice for proper control of the flow, and also strainer 34 for filtering out particles of dust which might clog the small bushing passage.

Within the upper cavity of the regulator body is pilot diaphragm 38 clamped at its periphery between intermediate body portion 13 and cover 14 to form pressure chambers 40 and 41, respectively above and below the diaphragm. For the purposes of supplying a predetermined force bearing downwardly upon the upper face of diaphragm 38, there is supplied weight 42 resting upon the diaphragm and free to slide vertically in recess 43 in the top of cap 14. The force exerted by weight 42 may also be obtained by the use of a spring, as will be seen in connection with Fig. 2, but the use of the weight is preferred since, for any selected weight, the force remains constant and cannot be tampered with by inexperienced persons, with the result that the regulator be thrown out of adjustment. Ports as at 48 and 49 are provided to permit application of modifying gas pressures above and below the pilot diaphragm, as will be described.

The underside of pilot diaphragm 38 bears against the top of pilot valve 46 which regulates the flow through port 45. This port has an area larger than bushing 37, so that gas may leave chamber 20 somewhat more rapidly than it enters; and the opening of port 45 thus causes, in chamber 20 above diaphragm 18, a pressure reduction proportional to the opening of the pilot valve. Compression spring 47, seating against body portion 13 and underneath the head of valve 46, is a light spring of only sufficient strength to normally raise the valve into open position, and is compressed when diaphragm 38 lowers to close the valve. The gas leaving chamber 20 by way of port 45 enters passage 50 which intersects vertically extending passage 51 that extends upwardly into communication at 52 with chamber 40 and downwardly into communication with delivery outlet 25. Chamber 40 may therefore be called the outlet pressure chamber; while chamber 41 below the pilot diaphragm may, for reasons developed hereafter, be called the reference pressure chamber.

The regulator is here shown in operative connection with a typical carbureter for internal combustion engines as disclosed in said application Ser. No. 671,979 of Roy F. Ensign. The carbureter air intake is at 60, and air may be taken directly from the atmosphere or from heating or cleaning devices (not shown) as may be desired. The air then flows through constricted Venturi throat 61 where fuel gas is introduced into the air stream to form a combustible mixture, and the mixture continues on into section 62 of the main suction passage where throttle valve 63 is located to control flow of the mixture to the engine (not shown). After passing the throttle valve, the mixture leaves the carbureter suction passage and enters the engine intake manifold 65.

Gaseous fuel is conveyed to the carbureter by means of line 66 which takes fuel from the regulator delivery passage 25 and conducts it to the carbureter fuel inlet passage 68 opening into Venturi throat 61. Flow into passage 68 is regulated by adjustable needle valve 69 which determines the effective area of the fuel inlet passage.

Outlet pressure chamber 40 of the regulator is placed in communication with the carbureter suction passage on the engine side of throttle 63 by means of a system of passages which will be termed the operating control. The operating control comprises tube 72 with its opening at one end through port 48 into pressure chamber 40 and with its opening at the other end through port 73 into the carbureter suction passage at a point above throttle 63. Needle valve 75 is manually adjustable to secure the proper effective size of port 73.

Although reference pressure chamber 41 may be vented directly to the atmosphere, it is preferred to place this chamber in communication with atmosphere at the main air intake 60. This is accomplished by means of balance tube 77 opening at one end through port 49 into chamber 41 and connected at the other end, by passages 78 and 79 in the carbureter, to air intake 60. By the use of this balance tube connection, the reference pressure at the under side of diaphragm 38 always will be in accord with the actual pressure at the carbureter air intake, so that the system will not be thrown out of balance if air cleaners, heaters, or the like are applied to the air intake. Proper control of the size of passage 79 is had by bushing 80 provided with a calibrated orifice.

Passage 78 also communicates with the suction passage of the carbureter through port 82 located just below throttle 63 when in the closed position, shown in Fig. 1, but passed by the throttle blade shortly after the throttle begins to open. In this manner balance tube 77 is also utilized to place chamber 41 in communication with the carbureter suction passage to further modify the action of the regulator valve as later will be explained.

I shall now explain the operation of the improved form of regulator. For the time being it will be most convenient to ignore the presence of the operating controls and their effect, and to assume that chamber 41 is vented to the atmosphere so that the pressure therein is atmospheric and constant. Beginning with a point in the operation when valve 26 is closed, gas from supply pipe 22 enters chamber 21 through passage 22 and enters chamber 20 through passages 35 and 36 so that, with port 45 closed, the pressures on opposite sides of diaphragm 18 become equal. These pressures will be whatever initial pressure exists in supply pipe 22; and in commercial practice gas may be supplied to the regulator from the usual service mains, from pressure tanks or bottles or any other suitable source. With the valve 26 closed and no gas being removed from outlet 25, the pressure in 25 is, in this case, atmospheric, which is greater than the normal delivery of this particular regulator, since, as will be explained, it is adjusted to deliver at subatmospheric pressures. The atmospheric pressure in 25 is communicated through passage 51 to outlet pressure chamber 40 so that, reference pressure in 41 being atmospheric, the pressures on both side of diaphragm 38 are equal and the effect of weight 42 is to lower the diaphragm against valve 46 to close port 45. With port 45 closed, chamber 20 is filled to maintain pressure therein. In this manner the fluid pressures acting upon each diaphragm become equalized, and both diaphragms close their respective valves.

When gas is withdrawn from the delivery passage, the pressure therein drops and there occurs a corresponding pressure drop in chamber 40. As soon as outlet pressure in 40 has fallen by an amount determined by the weight of the diaphragm 30, weight 42 and the thrust of spring 47, the reference pressure in chamber 41 begins to raise the diaphragm allowing spring 47 to lift pilot valve 46 and open port 45. With the opening of port 45, pressure in chamber 20 is relieved, the gas flowing by way of passages 50 and into the delivery passage. As soon as sufficient pressure drop takes place in 20 to compensate for the weight of the diaphragm and valve 26, the pressure in chamber 21 begins to lift diaphragm 18 and valve 26 permitting flow through the regulator into the delivery passage to maintain pressure there. Both diaphragms and valves are now in operation and floating between opposing forces.

From the foregoing it will be observed that the forces acting upon primary diaphragm 18 are the pressures in chambers 20 and 21, the force of spring 33, the weight of the valve and diaphragm assembly, and the differential in pressure between chambers 21 and 20. As the effect of spring 33 and the weight of the parts are constant, they need not be further considered in this discussion. Assuming initial pressure in 21 to be constant, the only variable causing actuation of primary diaphragm 18 is the varying pressure in chamber 20. This is the variable that is controlled by pilot valve 46. The force actuating diaphragm 18 is the pressure differential between 20 and 21 (minus the fixed weight of parts etc.). The maximum differential possible, given any predetermined initial and outlet pressures, is fixed by the relative sizes of orifices 37 and 45.

A consideration of the forces acting upon upper diaphragm 38 shows these to be the atmospheric pressure (reference pressure) in chamber 41, opposed by the combined forces of weight 42, a constant, and the outlet pressure in 40. The atmospheric pressure on the underside of the diaphragm is the pressure here selected as the base or reference pressure to which the delivery pressure is referred in order to properly control the pilot valve. Because the fluid pressure in 40 required to place the forces on the upper diaphragm in equilibrium is equal to the fluid pressure in 41 less the pressure equivalent of weight 42, it follows that the delivery pressure is less than atmospheric by a differential determined by the value of weight 42. Weight 42 being a fixed quantity, the delivery pressure will normally be less than the base or reference pressure in 41 by a fixed amount, and thus will be a constant pressure for any fixed base.

In operation the pilot diaphragm floats between its opposing forces and valve 46 floats off its seat.

Thus an increase in the rate of withdrawal from delivery 25 tends to cause a drop in the delivery pressure, but the corresponding drop in pressure chamber 40 permits the upper diaphragm instantly to rise and spring 47 further opens the pilot valve. The additional opening of the pilot valve decreases the pressure in chamber 20 and increases the pressure differential actuating the lower diaphragm with the result that the diaphragm rises further and opens valve 26 wider. The increased flow past valve 26 tends to restore the delivery pressure to normal so that the forces acting upon the diaphragms are again brought into equilibrium and the same delivery pressure is maintained, though at a greater delivery rate. If the withdrawal rate from the regulator decreases the delivery pressure tends to rise and the operations just described are reversed. Increased pressure in 40 closes down the pilot valve and diminishes the differential in pressure operating the lower diaphragm. This decrease in operating differential closes down the regulating valve. If at any time the delivery pressure becomes and remains substantially greater than that for which the regulator is set, the pilot valve will sea, pressures on diaphragm 18 equalize, and valve 26 close. In this manner the building up of pressure in the delivery passage at atmospheric when fuel is no longer being drawn from line 66 insures that the regulator valve will automatically close with the cessation of fuel usage, but will again automatically open when fuel is required.

The speed and sensitiveness of outlet pressure regulation will be seen to depend entirely on the relative sizes of orifices 37 and 45. In operation both diaphragms and valves are floating between opposed forces, so there is no appreciable lag in action. The amount by which diaphragm 18 rises or falls when pilot valve 46 opens or closes depends entirely on the relative size of orifice 45. If that orifice is made larger relative to orifice 37, the result is to make the diaphragm and valve 26 move and to relatively overcorrect the outlet pressure. If orifice 45 is relatively smaller the result is relative under correction. By proper relative sizing of those orifices the regulator may be made to maintain outlet pressure most accurately, regardless of the delivery volume within the regulator's capacity.

Since both sides of the lower diaphragm are in communication with the supply line, fluctuations in initial pressure will cause equal changes in the pressures in 20 and 21 so that the differential pressure operating the diaphragm 18 will remain constant, and any changes in pressure in outlet 25, due to changes in flow past valve 26 with pressure fluctuations in 21, are immediately compensated by action of the pilot diaphragm and valve. Thus the regulator is also independent of supply pressure fluctuations.

The foregoing discussion has shown how the regulator, when not subjected to the influence of any modifying forces, maintains a constant normal delivery pressure; and there will now be considered briefly the nature of the modifying forces, without reference to their source, and their effect upon the delivery pressure. In general, these modifying forces are applied to pilot diaphragm 38 and are preferably applied by changing the fluid pressure in either chamber 40 or 41.

First, assuming a constant pressure in 41, consider that a depression is applied to port 48 thus lowering the pressure in chamber 40. The result is to decrease the downward forces upon the pilot diaphragm so that the pilot valve is allowed to open further which, as explained before, opens the regulator valve to increase the rate of flow through the outlet. The outlet pressure then rises to a higher value and remains there as long as the lower pressure is maintained in chamber 40. To prevent the higher outlet pressure from immediately raising the pressure in 40, the relative sizes of ports 51 and 48 are such that depression induced flow through 48 is more free than through 51. The lowering of pressure in 40 has reduced the forces acting downwardly on diaphragm 38, and as long as that is the case there is a corresponding increase in outlet pressure.

Because the regulator will, under any given set of conditions, maintain a constant delivery pressure, so that the quantity of gas entering an engine will be determined by the velocity of air passing through a Venturi throat and because the delivery pressure may be made to change in consonance with any change in operating conditions, this regulator is particularly adapted to use with a carburetor for feeding fuel gas to an internal combustion engine. The regulator is illustrated in such a feed system, and there will be described a specific application of the modifying forces to vary the delivery pressure as required by certain operating conditions.

One of such modifying means is the operating control, the influence of which may be most marked at idling speeds. When the flow of air through the carburetor suction passage is restricted by nearly closing throttle 63, there is produced a relatively large depression above the throttle and a relatively small one below. A small regulated amount of the relatively large depression is communicated, subject to regulation by needle valve 75, by means of port 73 and tube 72 to pressure chamber 40 to decrease the pressure therein, and so raise the pressure of the fuel reaching inlet passage 68.

The depression at 73 is greatest with the throttle closed to idling speed, and the magnitude of the depression then communicated to chamber 40 may be such as to raise the delivery pressure appreciably above atmospheric, and by such increase in delivery pressure to enable the then very slight Venturi depression to draw in sufficient fuel, and to give the rich mixture required by the engine for best idling operation. Opening the throttle decreases the depression at port 73, so that the fuel delivery pressure declines, in order to return the mixture to normal for higher speeds. The operating control may continue to elevate the normal delivery pressure to atmospheric or higher, even at its minimum influence with the throttle wide open, or the influence of the control may sooner become negligible, allowing the delivery pressure to return to its normal value in the medium range of engine operation. The insertion of a restriction of predetermined or changeable size, at 51a, in passage 51, makes it possible to change the pressure in 40 independently of the pressure in 25.

Another such modifying means is embodied in balance tube 77 and passage 79 which place pressure chamber 41 in communication with air intake 60. If the air intake opens directly to the atmosphere, the reference pressure in 41 is to all intent and purposes atmospheric. However, the air may first pass through cleaners or other devices which restrict the flow so that, because of friction losses, the pressure at 60 is somewhat less than atmospheric and corresponding changes are produced throughout the carburetor passage; and furthermore, the friction losses may increase with the velocity of the air stream so that the pressure at 60 is not constant. The effect is to change the basic pressure in the carburetor; and the use of passage 79 and balance tube 77 keeps the pressure in 41 equal to the intake pressure, and properly compensates, by changing the delivery pressure as explained, for any pressure fluctuation at the air intake, to prevent the system from being thrown out of balance by the mixture being too rich.

A third means for modifying the movement of the pressure regulating valve, is economizer port 82 by means of which there is communicated to pressure chamber 41 the depression existing in the carburetor suction passage at a point just outside of or below the throttle when in closed position, but passed by the throttle shortly after opening movement begins. The function of the economizer port is entirely independent of the explained function of balance tube 77; but as a matter of convenience the economizer port is also connected with chamber 41 via tube 77.

When the throttle is closed, as shown in Fig. 1, the depression applied to port 82 is so small as to be without appreciable effect; but when the throttle has opened past idling sufficiently to uncover port 82, the port is then exposed to the relatively greater depression existing on the engine side of the throttle and a portion of this depression is communicated to chamber 41 to decrease the pressure therein, and correspondingly decrease the fuel delivery pressure. As the throttle continues to open, there is a rapid diminution in the amount of depression applied to the economizer port and consequently in the modifying influence of the port. In this manner, during that medium portion of the operating range when the engine operates satisfactorily on a leaner mixture, the decreased delivery pressure provides an economical mixture consistent with proper performance. The amount of depression so transmitted, is controlled by restricting the size of the economizer port and by the relative size of the orifice in bushing 80, since passage 79 operates in conjunction with the economizer to bleed off the depression in passage 78.

It will be observed that the operating control tends to enrich the mixture while the economizer has the opposite tendency. For this reason, the economizer port is so located with reference to the throttle that the port is not uncovered soon enough to interfere with the action of the operating control during the idling speed. The opposing influences of the two arrangements may be exerted simultaneously upon the regulator so that by proper interplay the delivery pressure may be maintained at any desired point, above the normal regulator delivery pressure if desired, to provide a mixture in the carburetor most suitable to operating conditions. The general or normal mixture proportions are of course regulated by needle valve 69.

Figure 2 illustrates a variational form of regulator which differs from the one previously described chiefly in the changed construction of the pilot valve and in the substitution of a spring for weight 42. The function of the parts is substantially the same as described in connection with Fig. 1, except as the arrangement is changed or modified in certain specific details now to be described.

Port 45 and passage 50 (Fig. 1) for relieving pressure from chamber 20 are replaced by passage 85 opening into chamber 20 at 85a, and extending through the body upwardly into cap 14. There passage 85 is connected by means of sized passage 86 to passage 88 which opens into pressure chamber 40 above the upper diaphragm. The communication between passages 86 and 88 is controlled by means of pilot valve 99 which has a sliding bearing in cap 14, the valve being moved upwardly to seal the passages one from the other and moves downwardly under its own weight to open the passages to gas flow. Pilot valve 99 rests upon one end of lever 91 which is fulcrumed intermediate its ends at pin 92. The opposite end of the lever is in engagement with stem 94 attached to diaphragm 38 so that movement of the diaphragm is transmitted to the pilot valve to operate it in the same general manner as explained in connection with Fig. 1. Weight 42 of the other form of regulator is replaced by spring 96 which seats on stem 94 and against adjusting screw 98, by means of which the force exerted by the spring may be adjusted.

In this form of regulator the delivery pressure may be quickly and easily brought to any desired value by adjustment of screw 98. Placing the spring under additional compression increases its downward force and decreases the delivery pressure by a like amount. Likewise, a decrease in the compression of spring 96 causes a corresponding increase in the delivery pressure; or the spring may be placed in tension and its force is added to the fluid pressure in 41 so that the delivery pressure must now exceed the base pressure in order that the gas pressure in 40 may be great enough to keep the diaphragm in a position of equilibrium. In this manner the regulator may be adapted to deliver at superatmospheric pressure, though it will be appreciated that the same result may be obtained by increasing the reference pressure in chamber 41 or by inserting an additional compression spring which would bear upwardly against the under side of diaphragm 38 and seat on regulator body portion 13 so that its effective force is added to the existing pressure in 41. In fact, the resultant of the reference force applied under the diaphragm and the predetermined force applied above it, may be considered in final action as a single predetermined force tending to move the diaphragm in either one direction or the other. These considerations also apply to Fig. 1.

Because of the comparatively large volume of the fuel, it is necessary in gas carbureters to make the venturi at 61 substantially larger than in liquid fuel carbureters, and consequently for a given engine speed, the rate of air flow through the venturi in a gas carbureter is comparatively low. It may happen that in starting the engine, the depression applied to fuel delivery passage 68 at the Venturi throat will not, by reason of the low air velocity at that point, be sufficient to overcome the weight 42, in Fig. 1, or the resistance of spring 96, in Fig. 2, or at least to a degree that will cause the pilot diaphragm and pilot valve to raise sufficiently to open the main regulator valve 26 to the extent required to give a proper starting mixture.

Under such conditions, a priming device may be employed to cause the regulator to deliver gas at a sufficient rate for starting purposes, independently of pressure conditions in the carbureter suction passage. As a typical priming device, I show in Fig. 3 an arm 100 carried on shaft 101 extending at 102 through the wall of body section 13, and having attached to its outer end a lever 103 to which may be connected any suitable manual control whereby shaft 101 may be rotated in the direction of the arrow in Fig. 1. Rotation of the shaft in that direction is resisted by a coil spring 104 which acts normally to maintain arm 100 out of contact with the pilot diaphragm, as in the position illustrated. In order to provide a priming fuel mixture for starting the engine until sufficient speed has developed to open the pilot valve as a result of depression communicated to chamber 40, the priming device is operated to swing arm 100 upwardly to lift the pilot diaphragm, thereby opening the pilot valve to cause the main regulator valve to open in the manner previously described.

The second variational form of pressure regulator shown in Fig. 4 is generally similar in construction and operation to the previously described forms, but has in some respects certain added advantages as a result of its capacity for extreme sensitiveness in response to modifying pressure influences communicated from the carbureter suction passage, and general smoothness in operation. The principal differences over the regulators shown in Figs. 1 and 2 consist of improvements in the pilot valve mechanism, the provision of means for preventing sudden and excessive movements of the main diaphragm and resultant excessive changes in the outlet gas pressure and delivery rate, also in the reversal of the pressure chambers at opposite sides of the pilot diaphragm and the elimination of a weighted or spring pressed force against the pilot diaphragm. I have also provided in this variational form an adjustment in the idling communication between the pilot diaphragm chamber and the carbureter suction passage so that the regulator performance may be adjusted to a nicety to supply just the correct amount of fuel for engine operation at idling.

As shown in Fig. 4, the high pressure gas from line 22 impinges against a baffle 106 at the mouth of passage 107, and is deflected into the chamber 108 below main diaphragm 109, from whence the gas passes under control of valve 110 to the outlet 111. The valve is releasably connected to member 112 carried by the diaphragm, by an expansible lock ring 113 below the flanged head 114 of the valve stem. Upward deflection of the diaphragm is resisted by radially extending springs 115 bearing against the body partition 116. The inlet gas pressure is communicated to chamber 117 above the diaphragm by way of passage 107, plug 118 having a calibrated orifice, and passage 119.

Chamber 117 above the main diaphragm is in communication via restricted orifice 120a with compression chamber 120, the purpose of which is to prevent and dampen out vibrations and sudden deflections of the main diaphragm and corresponding movements of the main valve 110. It may be mentioned that such influences as sudden substantial changes in the pressure differential between the inlet 22 and outlet 111 have a tendency to set up vibrations of the diaphragm and valve, and that in order to maintain a stable and even control of the gas flow to the carbureter, it is important that such vibration tendencies be prevented. For example, when there occurs a sudden pressure drop at the inlet 111, resulting in valve 143 becoming open because of the reduced pressure being communicated to the under side of the pilot diaphragm, with gas being bled from chamber 117 through the valve controlled passage 142, there is a tendency for main diaphragm 109 to become suddenly deflected upwardly. Any such sudden upward movement of the diaphragm hovever is retarded and dampened due to the restricted escape of gas from chamber 120 through orifice 120a into 117, this restricted flow of gas preventing sudden depletion of gas in 117 and resultant sudden pressure drop, and consequently any excessively sudden upward movement of the diaphragm and valve.

On the other hand, a sudden increase in the outlet pressure acting to suddenly close the valve 143 has a tendency to cause a sudden downward deflection of the main diaphragm and closing movement of the valve under the influence of the inlet gas pressure communicated to chamber 117 via passage 119. In this case, sudden downward deflection of the diaphragm is prevented by the presence of the closed chamber 120 and its communication 120a with chamber 117, because of the fact that rapid increase in the gas pressure within chamber 117 is prevented by the gas being allowed to flow through orifice 120a into chamber 120 until a pressure balance exists between that chamber and the diaphragm chamber 117. Under these conditions, the gas bleed into the closed chamber prevents the pressure from building up in chamber 117 so rapidly as to force the main diaphragm downwardly with such suddenness as to set up such vibration tendencies as mentioned above.

As previously mentioned, the regulator of Fig. 4 has the reference and variable pressure pilot diaphragm chambers reversed, the reference pressure chamber 121 communicating with balance tube 77' (corresponding to balance tube 77 of Fig. 1) but above the pilot diaphragm 122. Chamber 123 is formed below the pilot diaphragm by a removable partition plate 124 held in place by an expansible lock ring 125. Pilot diaphragm chamber 123 has an orifice communication at 126 with passage 127 connecting at its lower end with outlet 111, and at its upper end with passage 128 which in turn connects with the carbureter idling control via pipe 72' corresponding to pipe 72 of Fig. 1. The idling depression in the suction passage above the throttle is thus communicated to chamber 123 via an orifice 126, the depression being modified by gas bled in through passage 127 from the regulator outlet, and the gas bleed being restricted by reason of the constriction of 127a in passage 127. The amount or degree of the idling depression so communicated to the variable pressure chamber 123 may be accurately adjusted to give just the proper idling mixture by means of a manually adjustable needle valve 130 which controls orifice 131 in passage 128. It will be understood from the previous description of the regulator in Fig. 1 that under engine operation at normal speeds, the depression at the venturi will be transmitted to chamber 123 as in the previous instance, by way of the regulator discharge line 111, passage 127 and port 126.

The pilot valve mechanism, generally indicated at 132, is contained within a chamber 133 between partition plate 124 and wall 116, 116a of the center body section, chamber 133 having a communication 134 with passage 127, through which high pressure gas bled from chamber 117 under control of the pilot valve, passes to the outlet. The pilot valve mechanism comprises a valve lever 135 actuated by a pin 136 depending from the pilot diaphragm 137 through a central opening in plate 124, pin 136 having a sliding fit within the plate opening and carrying a lower end projection 136a which extends through an opening 138, see Fig. 5, in the valve lever. The latter rocks on a pair of fulcrums 139, and is retained in position within the limits of its rocking movement by a pair of pins 140 projecting up through openings 141 with a small amount of clearance. Main diaphragm chamber 117 is communicable with chamber 133 via passage 142 and bushing 143 having a small calibrated orifice 144. It will suffice to state that the relative sizes of orifice 144 and passage 119 correspond with orifice 45 and passage 35, in the regulator of Fig. 1.

The outer extremity of the valve lever 135 seats on bushing 143 to close orifice 144 and prevent the flow of high pressure gas from chamber 117 into chamber 133, the valve lever being held in its seating position by a coil spring 146 held beneath a bracket 147, and bearing against the valve lever at a point between fulcrums 139 and bushing 143. The spring 146 is located sufficiently close to bushing 143 to exert a positive closing force on the valve, and yet close enough to the fulcrums 139 that the leverage through which pin 136 acts is sufficiently great to render the valve sensitive to downward movement of the pilot diaphragm. This type of pilot valve mechanism is particularly desirable in view of the problem involved in controlling the flow of gas through an orifice as small as it is desired to make the pressure relief orifice 144. By tapering the upper end of the valve orifice bushing as illustrated, and causing the valve lever to seat flatly against the top of the bushing, proper and accurate operation of the valve is not affected by the small size of the aperture. Nor are there involved any of the difficulties that might be encountered through the use of a needle or other type valve; for example liability to sticking as a result of waxy accumulations in the valve guide.

In operation, remembering that a constant reference pressure is maintained in chamber 121 above the pilot diaphragm, upon the communication of a lower pressure to chamber 123, either via passage 127 or the idling communication 72', 128, the pressure above the diaphragm causes the pilot valve to open against the resistance of spring 146, the amount of resistance to valve opening imposed by the latter of course governing the sensitivity of the valve response to slight depressions in chamber 123. As in the operation of the previously directed regulators, high pressure gas is bled under control of the pilot valve from chamber 117 via chamber 133 to the outlet, causing the main valve to open in accordance with the depth of movement of the pilot valve and pilot diaphragm, and in accordance with the engine requirements as manifested by the amount of depression communicated to the variable pressure pilot diaphragm chamber 133.

It has been found in some instances that by reason of the high velocity of the gas entering the chamber beneath the main diaphragm from the inlet 22, foreign particles carried by the gas tend to accumulate within and clog the small passages through which the inlet gas pressure is communicated to the top side of the diaphragm. For example, despite the presence of baffle 106 in Fig. 4, the calibrated passage within bushing 118 and the small lateral passage 119 may become clogged by foreign particles carried by the inlet gas stream. Where this condition exists, the difficulty may be overcome by providing a restricted gas communication between chambers 108 and 117 as shown in Fig. 7. Here the flanged head 150 of the main valve stem 151 is shown to be supported on a pair of arcuate arms 152 depending from a disk 153 clamped between the diaphragm reenforcing plate 154 and the head 155 of bolt 156. Nut 157 threaded on the bolt is taken up against the top surface of the spring spider 158. In this instance the gas flows from the chamber below the diaphragm through clearance space 159 between members 150 and 155 into the bore 160 of bolt 156, and thence through a calibrated orifice 161 in nut 157, into the chamber above the diaphragm. It will be noted that in being threaded centrally within the chambers, the gas communication is at substantially the point of lowest gas velocity. Hence, any clogging particles carried by the gas will have had an opportunity to settle out before reaching the orifices 160 and 161, thereby mentioning that the latter will at all times remain unobstructed.

As a further precaution against clogging particles reaching the small orifices 161 in nut 157, a fine mesh screen 163 may be placed between the nut and the upper end of bolt 156. It may further be observed that ample clearance between head 155 of the nut and the valve stem head 150 is provided to permit flexure of the diaphragm within its normal limits without binding against the valve stem. Only a comparatively small amount of clearance at 159 is necessary however, and this clearance may be sufficiently small as to accomplish a preliminary separation of foreign particles that might otherwise be carried by the gas into passage 160.

Having illustrated and described certain embodiments of my invention, it is to be understood that the drawings and the foregoing description are to be considered as illustrative of rather than restrictive on the broader claims appended hereto for changes in arrangement and construction may occur to those skilled in the art without departing from the spirit and scope of said claims.

I claim:

1. In gas carbureting apparatus for engines, the combination comprising, a gas carbureter including a suction passage having an inlet, and an outlet; a gas pressure regulator having a high pressure gas inlet and a low pressure gas outlet communicating with said carbureter suction passage, a regulator valve controlling communication between said gas inlet and outlet, a primary diaphragm actuating the regulator valve, a pilot diaphragm, means for operating said main diaphragm and regulator valve in response to movements of said pilot diaphragm, and means placing one side of said pilot diaphragm in communication with said carbureter suction passage, whereby the pilot diaphragm is caused to move in response to pressure changes in the suction passage.

2. In gas carbureting apparatus for engines, the combination comprising, a gas carbureter including a suction passage having an inlet, an outlet and a venturi between said inlet and outlet; a gas pressure regulator having a high pressure gas inlet and a low pressure gas outlet communicating with said carbureter suction passage, a regulator valve controlling communication between said gas inlet and outlet, a primary diaphragm actuating the regulator valve, a pilot diaphragm, means for operating said main diaphragm and regulator valve in response to movements of said pilot diaphragm, and means placing one side of said pilot diaphragm in communication with said carbureter suction passage at said venturi, whereby the pilot diaphragm is caused to move in response to pressure changes in the venturi.

3. In gas carbureting apparatus for engines, the combination comprising, a gas carbureter including a suction passage having an inlet, an outlet, and a throttle between said inlet and outlet; a gas pressure regulator having a high pressure gas inlet and a low pressure gas outlet communicating with said carbureter suction passage, a regulator valve controlling communication between said gas inlet and outlet, a primary diaphragm actuating the regulator valve, a pilot diaphragm, means for operating said main diaphragm and regulator valve in response to movements of said pilot diaphragm, and means placing one side of said pilot diaphragm in communication with said carbureter suction passage at the outlet side of said throttle, whereby the pilot diaphragm is caused to move in response to pressure changes in the suction passage produced by movement of the throttle.

4. In gas carbureting apparatus for engines, the combination comprising, a gas carbureter including a suction passage having an inlet and an outlet, a venturi between said inlet and outlet and a throttle in the passage at the outlet side of the venturi; a gas pressure regulator having a high pressure gas inlet and a low pressure gas outlet communicating with said carbureter suction passage, a regulator valve controlling communication between said gas inlet and outlet, a primary diaphragm actuating the regulator valve, a pilot diaphragm, means for operating said main diaphragm and regulator valve in response to movements of said pilot diaphragm, and means placing one side of said pilot diaphragm in communication with said carbureter suction passage within said venturi and also at a point at the outlet side of said throttle.

5. In gas carbureting apparatus for engines, the combination comprising, a gas carbureter including a suction passage having an inlet, and an outlet; a gas pressure regulator having a high pressure gas inlet and a low pressure gas outlet communicating with said carbureter suction passage, a regulator valve controlling communication between said gas inlet and outlet, a primary diaphragm actuating the regulator valve, a pilot diaphragm, means for operating said main diaphragm and regulator valve in response to movements of said pilot diaphragm, means placing one side of said pilot diaphragm in communication with said carbureter suction passage, whereby the pilot diaphragm is caused to move in response to pressure changes in the suction passage, and means providing a reference pressure passage communicating to the opposite side of said pilot diaphragm the pressure in the suction passage inlet.

6. In gas carbureting apparatus for engines, the combination comprising, a gas carbureter including a suction passage having an inlet, an outlet and a venturi between said inlet and outlet; a gas pressure regulator having a high pressure gas inlet and a low pressure gas outlet communicating with said carbureter suction passage, a regulator valve controlling communication between said gas inlet and outlet, a primary diaphragm actuating the regulator valve, a pilot diaphragm, means for operating said main diaphragm and regulator valve in response to movements of said pilot diaphragm, means placing one side of said pilot diaphragm in communication with said carbureter suction passage at said venturi, whereby the pilot diaphragm is caused to move in response to pressure changes in the venturi, and means providing a reference pressure passage communicating to the opposite side of said pilot diaphragm the pressure in the suction passage inlet.

7. In gas carbureting apparatus for engines, the combination comprising, a gas carbureter including a suction passage having an inlet, an outlet, and a throttle between said inlet and outlet; a gas pressure regulator having a high pressure gas inlet and a low pressure gas outlet communicating with said carbureter suction passage, a regulator valve controlling communication between said gas inlet and outlet, a primary diaphragm actuating the regulator valve, a pilot diaphragm, means for operating said main diaphragm and regulator valve in response to movements of said pilot diaphragm, means placing one side of said pilot diaphragm in communication with said carbureter suction passage at the outlet side of said throttle, whereby the pilot diaphragm is caused to move in response to pressure changes in the suction passage produced by movement of the throttle, and means providing a reference pressure passage communicating to the opposite side of said pilot diaphragm the pressure in the suction passage inlet.

8. In gas carbureting apparatus for engines, the combination comprising, a gas carbureter including a suction passage having an inlet and an outlet, a venturi between said inlet and outlet and a throttle in the passage at the outlet side of the venturi; a gas pressure regulator having a high pressure gas inlet and a low pressure gas outlet communicating with said carbureter suction passage, a regulator valve controlling communication between said gas inlet and outlet, a primary diaphragm actuating the regulator valve, a pilot diaphragm, means for operating said main diaphragm and regulator valve in response to movements of said pilot diaphragm, means placing one side of said pilot diaphragm in communication with said carbureter suction passage within said venturi and also at a point at the outlet side of said throttle, and means providing a reference pressure passage communicating to the opposite side of said pilot diaphragm the pressure in suction passage inlet.

9. In gas carbureting apparatus for engines, the combination comprising, a gas carbureter including a suction passage having an inlet and an outlet; a gas pressure regulator having a high pressure gas inlet and a low pressure gas outlet, a regulator valve controlling communication between the inlet and outlet, a primary diaphragm actuating the regulator valve, chambers at opposite sides of said diaphragm, a communication between the inlet and the chamber at that side of the diaphragm where pressure tends to open said valve, a restricted communication for inlet pressure to the chamber at the opposite side of the diaphragm; a pilot diaphragm, a chamber at one side of the pilot diaphragm in communication with the regulator outlet, a restricted passage venting the chamber at that side of the primary diaphragm where pressure tends to close the regulator valve, a pilot diaphragm actuated valve controlling said restricted passage and acting to close the passage by virtue of the gas outlet pressure on the diaphragm, and means connecting said gas outlet with said carbureter suction passage and communicating to said pilot diaphragm chamber pressure variations in accordance with pressure variations in said suction passage.

10. In gas carbureting apparatus for engines, the combination comprising, a gas carbureter including a suction passage having an inlet and an outlet; a gas pressure regulator having a high pressure gas inlet and a low pressure gas outlet, a regulator valve controlling communication between the inlet and outlet, a primary diaphragm actuating the regulator valve, chambers at opposite sides of said diaphragm, a communication between the inlet and the chamber at that side of the diaphragm where pressure tends to open said valve, a restricted communication for inlet pressure to the chamber at the opposite sides of the diaphragm; a pilot diaphragm, a chamber at one side of the pilot diaphragm in communication with the regulator outlet, a chamber at the opposite side of the pilot diaphragm, a communication between the last mentioned chamber and said suction passage inlet, a restricted passage venting the chamber at that side of the primary diaphragm where pressure tends to close the regulator valve, a pilot diaphragm actuated valve controlling said restricted passage and acting to close the passage by virtue of the gas outlet pressure on the diaphragm, and means connecting said gas outlet with said carbureter suction passage and communicating to the first mentioned pilot diaphragm chamber pressure variations in accordance with pressure variations in said suction passage.

11. In gas carbureting apparatus for engines, the combination comprising, a gas carbureter including a suction passage having an inlet, an outlet, a venturi and a throttle between said venturi and the outlet; a gas pressure regulator having a high pressure gas inlet and a low pressure gas outlet, a regulator valve controlling communication between the inlet and outlet, a primary diaphragm actuating the regulator valve, chambers at opposite sides of said diaphragm, a communication between the inlet and the chamber at that side of the diaphragm where pressure tends to open said valve, a restricted communication for inlet pressure to the chamber at the opposite sides of the diaphragm; a pilot diaphragm, a chamber at one side of the pilot diaphragm in communication with the regulator outlet, a restricted passage venting the chamber at that side of the primary diaphragm where pressure tends to close the regulator valve, a pilot diaphragm actuated valve controlling said restricted passage and acting to close the passage by virtue of the gas outlet pressure on the diaphragm, and means connecting said gas outlet with said carbureter suction passage at the venturi and also at a point beyond the throttle in the direction of air flow, whereby the pilot diaphragm is made responsive to pressure variations both in the venturi and at said point beyond the throttle.

12. In gas carbureting apparatus for engines, the combination comprising, a gas carbureter including a suction passage having an inlet, an outlet, a venturi and a throttle between said venturi and the outlet; a gas pressure regulator having a high pressure gas inlet and a low pressure gas outlet, a regulator valve controlling communication between the inlet and outlet, a primary diaphragm actuating the regulator valve, chambers at opposite sides of said diaphragm, a communication between the inlet and the chamber at that side of the diaphragm where pressure tends to open said valve, a restricted communication for inlet pressure to the chamber at the opposite sides of the diaphragm; a pilot diaphragm, a chamber at one side of the pilot diaphragm in communication with the regulator outlet, a chamber at the opposite side of the pilot diaphragm, a communication between the last mentioned chamber and said suction passage inlet, a restricted passage venting the chamber at that side of the primary diaphragm where pressure tends to close the regulator valve, a pilot diaphragm actuated valve controlling said restricted passage and acting to close the passage by virtue of the gas outlet pressure on the diaphragm, and means connecting said gas outlet with said carbureter suction passage at the venturi and also at a point beyond the throttle in the direction of air flow, whereby the pilot diaphragm is made responsive to pressure variations both in the venturi and at said point beyond the throttle.

13. In gas carbureting apparatus for engines, the combination comprising, a gas carbureter including a suction passage having an inlet and an outlet; a gas pressure regulator having a high pressure inlet and a low pressure outlet communicating with said suction passage, a regulator valve controlling communication between the inlet and outlet, a primary diaphragm actuating the regulator valve, chambers at opposite sides of said diaphragm, a communication between the inlet and the chamber at that side of the diaphragm where pressure tends to open the regulator valve, a restricted communication for inlet pressure to the chamber at the opposite side of the diaphragm, means connected with the last mentioned chamber for maintaining said diaphragm against sudden excessive movement in a valve opening direction; a pilot diaphragm, a chamber at one side of the pilot diaphragm in communication with the regulator outlet, a restricted passage venting the chamber at the side of the primary diaphragm where pressure tends to close the regulator valve, a pilot diaphragm actuated valve controlling said restricted passage and acting to close the passage by virtue of outlet pressure on the diaphragm, and means applying a predetermined force tending to move the pilot valve in one direction.

14. In gas carbureting apparatus for engines, the combination comprising, a gas carbureter including a suction passage having an inlet and an outlet; a gas pressure regulator having a high pressure inlet and a low pressure outlet communicating with said suction passage, a regulator valve controlling communication between the inlet and outlet, a primary diaphragm actuating the regulator valve, chambers at opposite sides of said diaphragm, a communication between the inlet and the chamber at that side of the diaphragm where pressure tends to open the regulator valve, a restricted communication for inlet pressure to the chamber at the opposite side of the diaphragm; a pilot diaphragm, a pilot valve operated by said pilot diaphragm, a chamber at one side of the pilot diaphragm in communication with the regulator outlet, a pilot diaphragm actuated lever controlling said pilot valve, a restricted passage venting the chamber at that side of the primary diaphragm where pressure tends to close the regulator valve, said pilot valve controlling said restricted passage and acting to close the passage by virtue of outlet pressure on the diaphragm, and means applying a predetermined force tending to move the pilot valve in one direction.

15. In gas carbureting apparatus for engines, the combination comprising, a gas carbureter including a suction passage having an inlet and an outlet; a gas pressure regulator having a high pressure inlet and a low pressure outlet communicating with said suction passage, a regulator valve controlling communication between the inlet and outlet, a primary diaphragm actuating the regulator valve, chambers at opposite sides of said diaphragm, a communication between the inlet and the chamber at that side of the diaphragm where pressure tends to open the regulator valve, a restricted communication for inlet pressure to the chamber at the opposite side of the diaphragm; a pilot diaphragm, a chamber at one side of the pilot diaphragm in communication with the regulator outlet, a restricted passage venting the chamber at that side of the primary diaphragm where pressure tends to close the regulator valve, a pilot diaphragm actuated valve controlling said restricted passage and acting to close the passage by virtue of outlet pressure on the diaphragm, and means providing a communication between said pilot valve chamber and said suction passage independently of the communication of the regulator outlet with said suction passage.

16. In gas carbureting apparatus for engines, the combination comprising, a gas carbureter having a suction passage, a gas pressure regulator having a high pressure inlet and a low pressure outlet communicating with said suction passage, a regulator valve controlling communication between the inlet and outlet, a primary diaphragm actuating the regulator valve, chambers at opposite sides of the primary diaphragm, a communication between the inlet and the chamber at that side of the primary diaphragm where pressure tends to open the regulator valve, a restricted communication for inlet pressure to the chamber at the opposite side of the diaphragm; a pilot diaphragm, a chamber at one side of the pilot diaphragm in communication with the outlet, a pipe connecting with said carbureter suction passage and communicating to the last mentioned chamber and pilot diaphragm a variable pressure independent of the pressure in said outlet, a pressure chamber at the opposite side of the pilot diaphragm, a pipe connecting the last mentioned chamber with the carbureter suction passage intake and communicating thereto and to the pilot diaphragm the intake air pressure, a pressure relief passage leading directly from the chamber at that side of the primary diaphragm where pressure tends to close the regulator valve, and a pilot valve actuated by the pilot diaphragm and controlling the flow of fluid through the relief passage, said pilot valve being relatively small and closing against the high pressure in the second mentioned primary diaphragm chamber.

ORVILLE H. ENSIGN.